(No Model.)

C. M. BAUM.
STEAM TRAP.

No. 506,806. Patented Oct. 17, 1893.

Witnesses:
W. A. Schaefer
Thomas M. Smith

Inventor:
Clarence M. Baum,
By J. Walter Douglass
Attorney.

UNITED STATES PATENT OFFICE.

CLARENCE M. BAUM, OF PHILADELPHIA, PENNSYLVANIA.

STEAM-TRAP.

SPECIFICATION forming part of Letters Patent No. 506,806, dated October 17, 1893.

Application filed April 29, 1893. Serial No. 472,290. (No model.)

*To all whom it may concern:*

Be it known that I, CLARENCE M. BAUM, a citizen of the United States, residing at the city of Philadelphia, in the county of Philadelphia and State of Pennsylvania, have invented certain new and useful Improvements in Steam-Traps, of which the following is a specification.

My invention has relation to steam traps or similar appliances for automatically draining entrained water or water of condensation and extraneous matter from steam pipes and other somewhat similar apparatus.

The principal objects of my invention are first, to provide a simple, durable, reliable and comparatively inexpensive appliance or apparatus for draining entrained water or water of condensation and extraneous matter from steam pipes, radiators and the like; second, to provide such an appliance or apparatus with internal means for baffling or directing steam and water of condensation through a chamber in a direction parallel or substantially so to the wall or surface thereof to an outlet conduit located at the lowest part thereof; third, to provide an apparatus with an inlet, an outlet and with a buoyant-device for normally closing the outlet thereof; fifth, to provide an apparatus with automatic means for draining water of condensation and extraneous matter from pipes, radiators and other somewhat similar appliances and for preventing the escape of steam from the outlet or drip-discharge thereof; and sixth, to provide an apparatus or trap with a buoyant-device normally seated to the outlet and with a director or arched baffle-plate located near the inlet conduit, the construction and arrangement being such, that entrained water or water of condensation is caused to follow in its travel a path parallel or substantially so with the wall of the apparatus to the buoyant-device actuated by the water accumulating in the bottom around or about the same to permit of the discharge of the water through the outlet while at the same time the escape of steam is prevented from the apparatus.

My invention consists of the improvements in steam traps hereinafter described and claimed.

The nature and characteristic features of my invention will be more fully understood from the following description taken in connection with the accompanying drawings forming part hereof; and in which—

Figure 1:
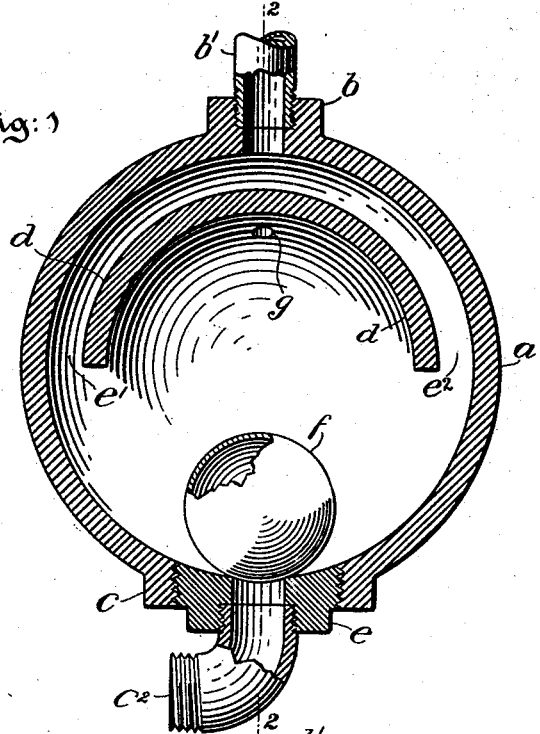
Figure 2:
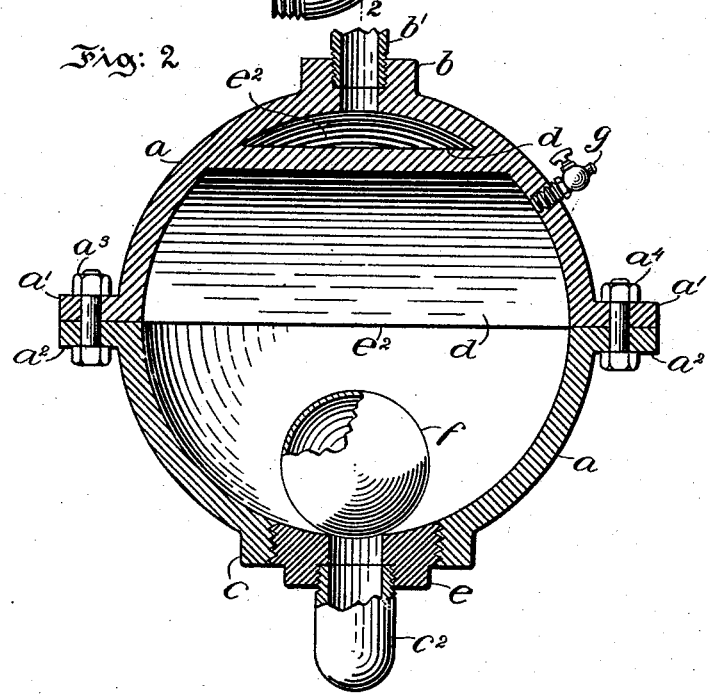

Figure 1, is a vertical central section through an apparatus or appliance embodying features of my invention; and Fig. 2, is a vertical transverse section on the line 2—2, of Fig. 1, but showing a slightly modified form of chamber divided in two parts and bolted together and with the buoyant-device seated in the mouth of the drip-discharge or outlet-conduit thereof.

Referring to the drawings $a$, is a casting or casing forming a chamber or receptacle for entrained water or water of condensation and extraneous matter applicable to steam heating systems, radiators, steam-kettles and the like and provided with a flanged inlet $b$, at the top having the interior wall threaded for the reception of the pipe $b'$.

$c$, is a flanged outlet located at the bottom of the chamber or receptacle $a$, and having the interior thereof threaded for the reception of a threaded bushing $e$, made of aluminum-bronze or other suitable material and to which is detachably secured a threaded pipe, elbow or nipple $c^2$, forming the discharge or outlet of the chamber or receptacle $a$.

$d$, is an arched director or baffle-plate formed preferably integral with the internal surface or wall of the casing or casting constituting the chamber $a$, and located in the upper part thereof in such manner that the entrained water or water of condensation and extraneous matter contained therein and entering through the inlet $b$, is caused to contact with the surface of the director or baffle plate $d$, and falls by gravity from the lower surfaces thereof through the opening or spaces $e'$ and $e^2$, on each side into the lower portion of the chamber or receptacle $a$, collecting at the bottom and thus moving the buoyant-device $f$, forming a float valve seated to or in the mouth of the discharge or outlet, that is, automatically permitting of the discharge of entrained water, extraneous matter or water of condensation therefrom, through the pipe, elbow or nipple $c^2$. The buoyant-device $f$, normally seated in the mouth of the outlet-conduit is adapted to close the entrance to the pipe $c^2$, in such manner as to prevent the escape of steam therethrough and to be automatically lifted or floated from its seat, by the weight of the water of condensation with its extraneous matter in the chamber $a$, in order to permit of the escape of the same through the discharge or outlet.

In Fig. 2, the receptacle or chamber $a$, is made in two parts with flanges $a'$ and $a^2$, secured to each other by means of bolts $a^3$, and nuts $a^4$, or in any other preferred manner. The advantage of making the chamber or receptacle $a$, in two parts, is to permit of the employment of a ball or buoyant-device of greater dimension than the outlet opening $c$.

Beneath the arched baffle or director plate in the wall of the chamber $a$, is provided an air valve provided with a pet-cock $g$, in order that the free discharge by gravity of the water of condensation from the upper portion of the chamber into the lower portion thereof preparatory to its discharge through the outlet as hereinbefore explained, may not be interfered with in the normal operation of the appliance.

The mode of operation of the apparatus hereinbefore described, is as follows: Steam, water of condensation and extraneous matter that may be contained therein and entering at the inlet conduit $b$, comes in contact with the arched director or baffle-plate $d$, and is deflected in two directions, thereby falling by gravity in paths parallel or substantially so to the interior wall or surface of the chamber or receptacle and collects in the bottom thereof around or about the buoyant-device $f$, thereby actuating the same sufficiently to permit of the discharge thereof through the outlet or drip discharge into any convenient receptacle. Any air in the chamber $a$, will be permitted to escape by opening the pet-cock $g$, which is to be kept closed during the normal operation of the appliance, in order to prevent any escape of steam from the chamber $a$, through said valve.

I am aware that prior to my invention steam-traps have been provided with float valves having an up and down movement therein, but obstacles to the use thereof were presented in that extraneous matter, such as dirt, oil or the like contained in the steam conducted along therewith through the trap clogged the stems of the valve as well as the bearings therefor and in consequence soon rendered the valve inoperative.

The advantageous feature of my invention is that the rolling body is normally maintained by suction in contact with the outlet of the trap and the steam is presented thereto in such manner as that the rolling-body is moved just sufficiently to permit of the discharge of the water of condensation and extraneous matter from the trap and returned again positively by suction to its initial position in the outlet of the trap.

Having thus described the nature and objects of my invention, what I claim as new, and desire to secure by Letters Patent, is—

The combination, in a steam-trap, of a spherical chamber provided with an air valve in the upper portion of the same, a curved baffle-plate arranged adjacent to the inlet in the top of said chamber, an outlet in the bottom thereof, and a rolling-body normally seated in said outlet, the construction and arrangement being such, that water of condensation and extraneous matter are permitted to follow a path adjacent to the wall of the trap to the rolling-body actuated thereby from substantially beneath the same to permit of the escape of the water and any extraneous matter contained therein, without the escape of steam from the trap.

In testimony whereof I have hereunto set my signature in the presence of two subscribing witnesses.

CLARENCE M. BAUM.

Witnesses:
THOMAS M. SMITH,
RICHARD C. MAXWELL.